United States Patent [19]

Tian et al.

[11] Patent Number: 5,768,055
[45] Date of Patent: Jun. 16, 1998

[54] MAGNETIC RECORDING HEAD HAVING A CARBON OVERCOAT ARRAY ON SLIDER AIR BEARINGS SURFACES

[75] Inventors: Hong Tian, Tai Po, Hong Kong; Hao Qing Pan, Tian Jin, China; Po-Kang Wang, Tai Po, Hong Kong; Takehiro Kamigama, Kowloon, Hong Kong; Cheng-Teh Wu, Shatin, Hong Kong; Tommy Chan, Tsuen Wan, Hong Kong

[73] Assignee: SAE Magnetics (H.K.) Ltd., San Jose, Calif.

[21] Appl. No.: 716,040

[22] Filed: Sep. 19, 1996

[51] Int. Cl.$^6$ ................................................ G11B 5/60
[52] U.S. Cl. ......................................................... 360/103
[58] Field of Search ....................................... 360/103, 104

[56] References Cited

U.S. PATENT DOCUMENTS

| | | | |
|---|---|---|---|
| 5,010,429 | 4/1991 | Taguchi et al. | 360/103 |
| 5,079,657 | 1/1992 | Aronoff et al. | 360/103 |
| 5,198,934 | 3/1993 | Kubo et al. | 360/104 |
| 5,231,613 | 7/1993 | Nakayama et al. | 360/103 X |
| 5,285,337 | 2/1994 | Best et al. | 360/103 X |

OTHER PUBLICATIONS

T. Kasamatsu et al., "Stiction Free Slider for the Smooth Surface Disk," *IEEE Transactions of Magnetics*, vol. 31, No. 6, Nov. 1995, pp. 2961–2963.

*Primary Examiner*—John H. Wolff
*Attorney, Agent, or Firm*—Kenyon & Kenyon

[57] ABSTRACT

A magnetic head is described for use in a disk drive having a disk that is rotated during operation of the disk drive and stationary when the disk drive is non-operational. The disk includes a surface containing data tracks. The magnetic head compromises a slider including a forward edge, a trailing edge and an air bearing surface. A read/write transducer is mounted at the trailing edge of the slider. The slider and transducer are mounted within the disk drive, relative to the surface of the rotating disk, to fly above the surface of the disk during rotation of the disk, for reading and writing data from and to the data tracks, and to come to rest on the surface of the disk during non-operation of the disk drive. An array of overcoat protrusions is formed on and spaced across the slider to cover a predetermined and discrete area of the slider in a manner so that when the slider and transducer come to rest on the surface of the disk, contact with the surface of the disk occurs only at the array of overcoat protrusions.

17 Claims, 9 Drawing Sheets

CVD, Sputtering, or Ion Beam Deposition

↓

Applying Photo Resist Materials

UV treatment with a Photo Mask

Oxygen Plasma Etch or Reactive Ion Etch

↓

> # 5,768,055

MAGNETIC RECORDING HEAD HAVING A CARBON OVERCOAT ARRAY ON SLIDER AIR BEARINGS SURFACES

FIELD OF THE INVENTION

The present invention is directed to a magnetic recording head, and in particular, to a magnetic recording head having a carbon overcoat array on slider surfaces of the recording head.

BACKGROUND OF THE INVENTION

Disk drives are information storage devices that include magnetic disks, magnetic heads, and an actuator. There are typically a plurality of disks separated by spacing rings and stacked on a hub that is rotated by a spindle motor. The disk surfaces are divided into a series of data tracks that extend circumferentially around the disk. Each data track can store data in the form of magnetic transitions on the disk surface. Each magnetic head comprises a slider and a transducer, and is mounted to a rotary actuator arm of the actuator via a flexure suspension. The actuator arm operates to move the head to a desired position over the disk surface for reading and writing information on the data tracks of the rotating disk. A housing is used to support the motor and the head actuator. In general, the drive is in a sealed environment for protection of the head/disk interface.

In a conventional disk drive, the slider has an air-bearing-surface (ABS) which provides an air bearing above the disk surface when the disk is rotating at its operational speed. At the operational speed, the slider causes the head to fly over the disk surface, while the transducer, which is mounted at the trailing edge of the slider, reads or writes data from or to the disk surface. When the disk drive becomes non-operational, the slider comes to rest on the disk surface, typically on a landing zone arranged at the inner or outer diameter of the disk, away from data tracks. At the onset of drive operation, the spindle motor has to provide enough power to overcome the static friction between the slider and the disk surface (referred to as stiction in the magnetic recording industry). After the disk is rotated to the full operational speed, the slider is separated from the disk surface and flies above the disk surface to read or write information on data tracks. The contact of the slider during start and stop operations is referred to as contact start/stop operation (CSS). The contact start/stop functionality is often evaluated using a contact start/stop testing method in which the drive is operated to go through repeated starting and stopping modes for many cycles with a measurement of stiction at each CSS cycle.

The spacing between the disks and the heads (fly height), while the disk drive is operating, has been reduced significantly during the last few years to achieve a higher recording density. Accordingly, it has been found to be necessary to form the disk surface to a very smooth finish to assure little or no head/disk contact during fly height operation of the disk drive. However, it is well known in the magnetic recording industry that a smooth disk surface induces high stiction, especially with the existence of a liquid at the head/disk interface. Therefore, it is a common practice in the magnetic recording industry to rough the disk surface, by texturing, for reduction of stiction during contact start and stop operations of the disk drive. Optimization of surface texturing has become a critical technology in disk drive manufacturing.

Another solution proposed in the prior art to reduce stiction at the head/disk interface is to make the slider ABS surface rough. However, a rough ABS surface generally results in a greater pole-tip-recession (PTR) of the read/write element of the transducer. (PTR is defined as the step distance between the ABS surface and the read/write pole area of the transducer.) The greater the PTR is, the greater is the effective head/disk magnetic spacing. Thus, the benefits of roughing the ABS surface are overshadowed by the resulting increase in magnetic spacing between the read/write transducer and the disk surface. This is the main disadvantage of roughing slider ABS surface. In practical applications, it is common to make the slider ABS surface smooth and to make the disk surface rough. A smooth ABS surface will lead to a smaller PTR, which in turn, will reduce the head/disk magnetic spacing. On the other hand, an optimized rough disk surface reduces stiction at the head/disk interface.

A further technology trend is to use a zone textured disk. In a zone textured disk, the landing zone (where the slider is resting when the drive is off) is textured by laser or other mechanical means. However, the data zone (containing the data tracks where the head is reading or writing information at a fly height) is either not textured or slightly textured to reduce the head/disk contact during the drive operation. This technique enables separate, optimization of each of the CSS landing zone and the data zone, to achieve lower head/disk spacing for a higher recording density, while reducing stiction encountered during contact stops and starts. When the zone textured disks are used in the drive, however, some special procedures have to be adopted during drive assembly to avoid a head from coming into contact with the disk surface within the data zone. Also, the actuator has to provide enough latch force to prevent the head from contacting the disk surface within the data zone during shipping and after the drive is turned off. If such contacts occur, the high stiction at the head/disk interface within the smooth data zone will prevent the drive from starting.

As magnetoresistive (MR) heads are introduced into disk drives, a layer of carbon overcoat is often applied to the slider surface to protect corrosion of read/write elements. One of the side benefits of a carbon overcoat on the slider surface is that the stiction at the head/disk interface is also reduced significantly. The major drawback of a carbon overcoat, however, is that the effective head/disk spacing is also increased by an amount equal to the thickness of the carbon overcoat. Thus, there is a compromise between the head/disk magnetic spacing requirement and the stiction requirement for an optimal head/disk interface design.

In order to achieve ever higher magnetic recording density, a very smooth disk surface has to be used and the thickness of the carbon overcoat on the slider surface has to be reduced to a minimum amount. Two important issues have to be resolved to achieve the above objectives: lower stiction at the head/disk interface when a smooth disk is used and protection of the read/write elements against environmental corrosion when an MR head is used.

One solution proposed in the prior art is described in "Stiction Free Slider for the Smooth Surface Disk" (IEEE Transactions On Magnetics, Vol. 31, No. 6, November 1995). The IEEE article illustrates a slider having three separated and isolated cylindrical carbon overcoat pads. One of the pads is formed at the center of one end of the slider, and the other two pads are formed at the other end of the slider, spaced from one another, with each pad being proximate to one of the side edges of the slider. The IEEE article states that the three isolated pads reduce stiction at head/disk interface when a smooth surface disk is used in the disk drive. However, the three, isolated pad arrangement described in the IEEE article has several drawbacks.

First the effectiveness of the pads depends on the profile orientation (crown, camber and twist) of the slider. For a wide range of slider profiles, which are typically encountered in a practical manufacturing environment, parts of the slider other than the pad locations, may be in contact with the disk surface. In that case the stiction at the head/disk interface will be very high. Secondly, there is no back-up support for the head/disk interface once one of the pads is worn away or becomes defective. Finally, for a laser zone textured disk, the disk surface has a discrete surface texture, and the use of a few spaced and isolated pads will not result in head/disk contact only at a pad location of the slider.

SUMMARY OF THE INVENTION

The present invention provides a overcoat arrangement for an ABS slider to effectively reduce stiction at the head/disk interface, regardless of slider profile and disk surface texture. It has been found that the carbon overcoat on slider surfaces can be optimized separately according to its two main functions: stiction reduction and corrosion protection.

According to the present invention, for stiction reduction, the carbon overcoat is applied to the ABS surface in an array of individual carbon overcoat protrusions that are spaced across the slider surface and comprise a small and discrete area of the ABS surface. For example, in an exemplary embodiment of the present invention, the carbon overcoat protrusions comprise a total surface area equal to approximately 1% to approximately 15% of the total surface area of the slider. Each carbon overcoat protrusion is of a thickness sufficient to assure that head/disk contact only occurs where there is one or more carbon overcoat protrusions, but thin enough to have little effect on the flying characteristics of the slider. There are important advantages provided by the spaced carbon overcoat protrusion arrangement according to the present invention. First, the contact area of the head/disk interface is limited to the 1% to 15% total area provided by the array of carbon overcoat protrusions to reduce stiction at head/disk interface. Secondly, the carbon overcoat array is such that the slider surface is compatible with the disk surface texture, in particular laser zone textured disks. That is, the head/disk contact occurs only between the protrusions of the carbon overcoat array and any high asperities of the disk surface. The array of carbon overcoat protrusions affords the full advantages of lower stiction provided by a full carbon overcoat.

A thin seed layer (typically SiO$_2$ )can be applied to the slider surface prior to the deposition of the carbon overcoat protrusions to increase the adhesion between the carbon overcoat and the slider ABS surface. This seed layer can be applied just thick enough to protect read/write elements of MR heads from corrosion. Moreover, with the seed layer, there is no need to apply the carbon overcoat to read/write elements of the head so that the head/disk magnetic spacing can be kept at a minimum. Accordingly, only the seed layer covers the whole slider surface while the carbon overcoat covers a discrete, specified area of the slider surface in a spaced array of protrusions.

In some exemplary embodiments of the present invention, a double carbon overcoat is applied to the slider surface. The first carbon layer covers the whole slider surface as generally done in the prior art. The second layer of carbon is applied on the first layer of carbon but in an array of spaced protrusions according to the present invention. Consequently, the first carbon layer protects the read/write elements of the transducer from corrosion, while the second carbon overcoat array reduces stiction at the head/disk interface.

The performance of disk drives using sliders having an array of carbon overcoat protrusions according to the present invention may be improved significantly when there is a greater margin provided at the landing zone and a safety margin at the data zone. Furthermore, it is also possible to use non-textured disk surfaces in the drive provided that stiction is reduced enough through use of a slider according to the present invention.

DETAILED DESCRIPTION

Figure 1:
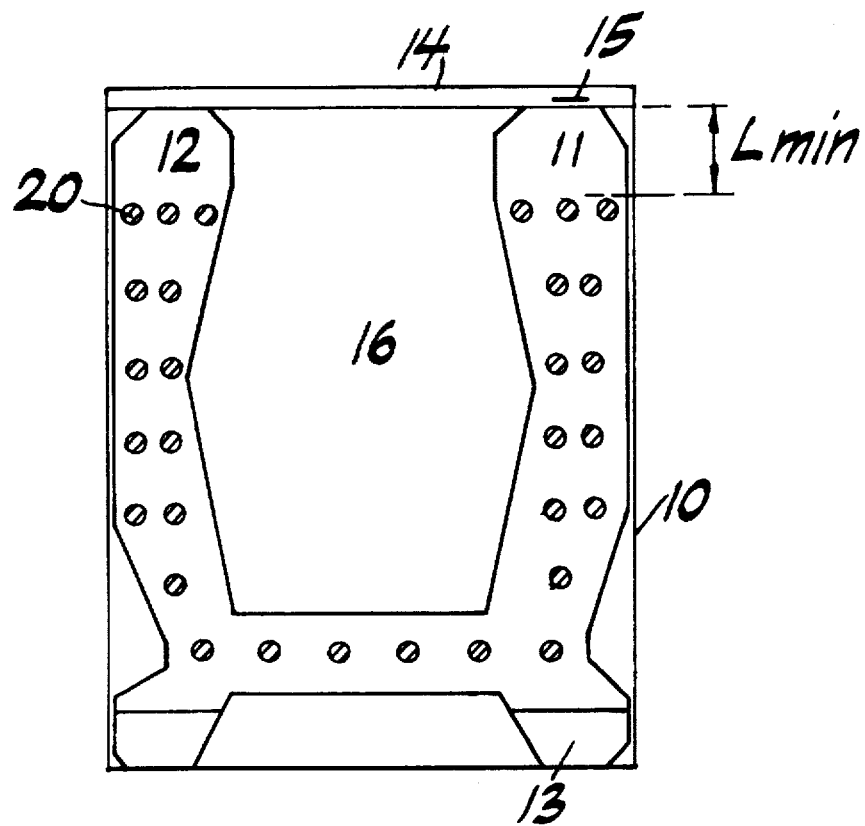
FIG. 1 is a bottom view of a slider ABS surface with a carbon overcoat array according to the present invention.

Referring now to the drawings, and initially to FIG. 1, there is illustrated a bottom view of an air bearing surface (ABS) of a magnetic head. The air bearing surface is provided with an overcoat array according to the present invention. In the illustrated embodiment of the present invention, the overcoat comprises a material such as carbon. In FIG. 1, a slider 10 includes two side rails 11, 12, a leading edge 13 (air-intake side edge of the flying slider) and a trailing edge 14. A read/write transducer element 15 is located at the trailing edge 14 of the slider 10. An overcoat array comprises a set of spaced, individual protrusions or bumps 20 made from carbon and spaced from one another across the surface of the slider 10.

Figure 2:
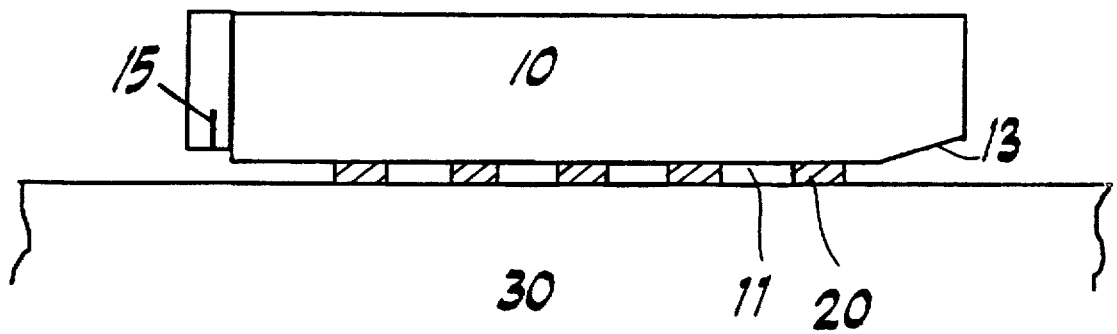
FIG. 2 is a side view of the slider of FIG. 1 when the slider (with the carbon overcoat array) is at rest on a stationary disk surface.

FIG. 2 provides a side view of the slider 10 with the bumps 20 of the carbon overcoat array resting on a stationary disk surface 30. According to the present invention, each bump 20 of the carbon overcoat array is of sufficient height and the array of bumps 20 is distributed evenly enough across the surface of the slider 10 such that only carbon bumps 20 come into contact with disk surfaces for a wide range of slider profile orientations.

Figure 3:
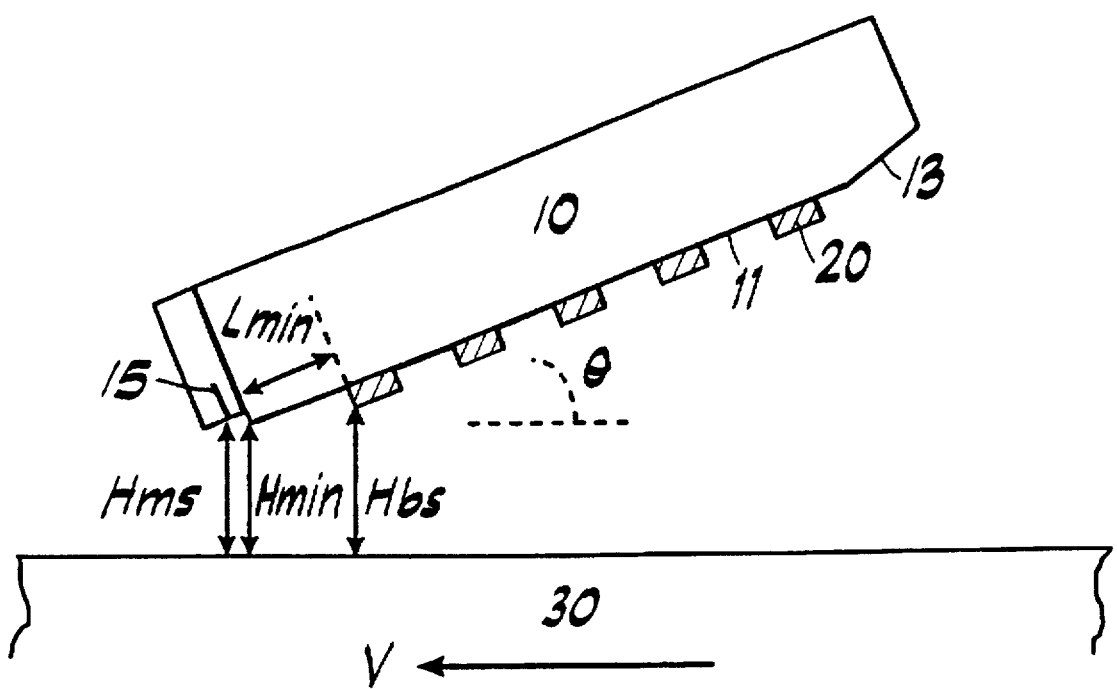
FIG. 3 is a side view of the slider of FIG. 1 when the slider (with the carbon overcoat array) is flying above a rotating disk surface.

To that end, FIG. 3 is a side view of the slider 10 when the disk 30 is rotating at an operational speed V. As the disk 30 rotates, the slider 10 flies above the disk surface due to the action of the incoming air flow on the ABS slider 10.

During flight, the slider 10 is pitched at an angle 0. Hmin indicates the physical spacing between the slider 10 and the surface of the disk 30, as measured at the end of the side rail 11. Hms is the spacing between read/write elements of the transducer 15 and the surface of the disk 30 (magnetic spacing). Hbs is the spacing between the lowest one of the carbon bumps 20 and the surface of the disk 30, and is greater than each of Hmin and Hms during rotation of the disk at speed V.

Lmin represents the distance between the end of the side rails 11, 12 (only side rail 11 shown in the side view of FIG. 3) and the nearest of the bumps 20. According to the present invention, the height and the location of the carbon bumps 20, particularly as measured by Lmin, should be such that Hbs is less than or equal to Hmin for a CSS range of pitch angles, that is a range of pitch angles occurring between the at rest position of the slider 10 shown in FIG. 2 and the operational fly height pitch angle shown in FIG. 3. In this manner, the carbon bumps 20 will contact the surface of the disk 30 as the fly height decreases during a stop operation, due to Hbs being less than Hmin in the CSS range, but the carbon bumps 20 will have little effect on the head/disk magnetic spacing, Hms, when the slider 10 is at the pitch shown in FIG. 3, during normal fly height operation since Hbs is greater than Hms at the operational speed V of the disk 30. The arrangement of the bumps 20 starting at least Lmin from the end of the rail 11 also results in the carbon bumps 20 having little effect on the minimum spacing of the head/disk interface, Hmin, when the drive is in operation, as shown in FIG. 3.

It should be noted that the pitch angle of the slider 10 is related to the particular slider ABS design and the disk velocity. The present invention is not limited to any particular shape of the ABS design or any particular shape of each carbon bump 20. FIGS. 1-3 are only for illustration purposes. The dimensions of the carbon overcoat array relevant to the present invention are the bump size (in diameter if the bump is circular in cross section), the bump height, the ratio of the total bump area to the total ABS area and the spacing between individual bumps. Therefore any type of ABS design, including a single rail design, two rail design, tri-rail design, and so on, can be usable with the present invention so long as the above dimensions are set to provide initial contact with the disk surface by the bumps 20, as described above. Moreover, the location of the read/write transducer 15 is not limited to the side rail 11. As long as the Hbs is greater than Hmin at the operational speed V as shown in FIG. 3, the location of the read/write element can be anywhere at the trailing edge of the slider 10.

EXEMPLARY EMBODIMENTS OF THE INVENTION

Figure 4:
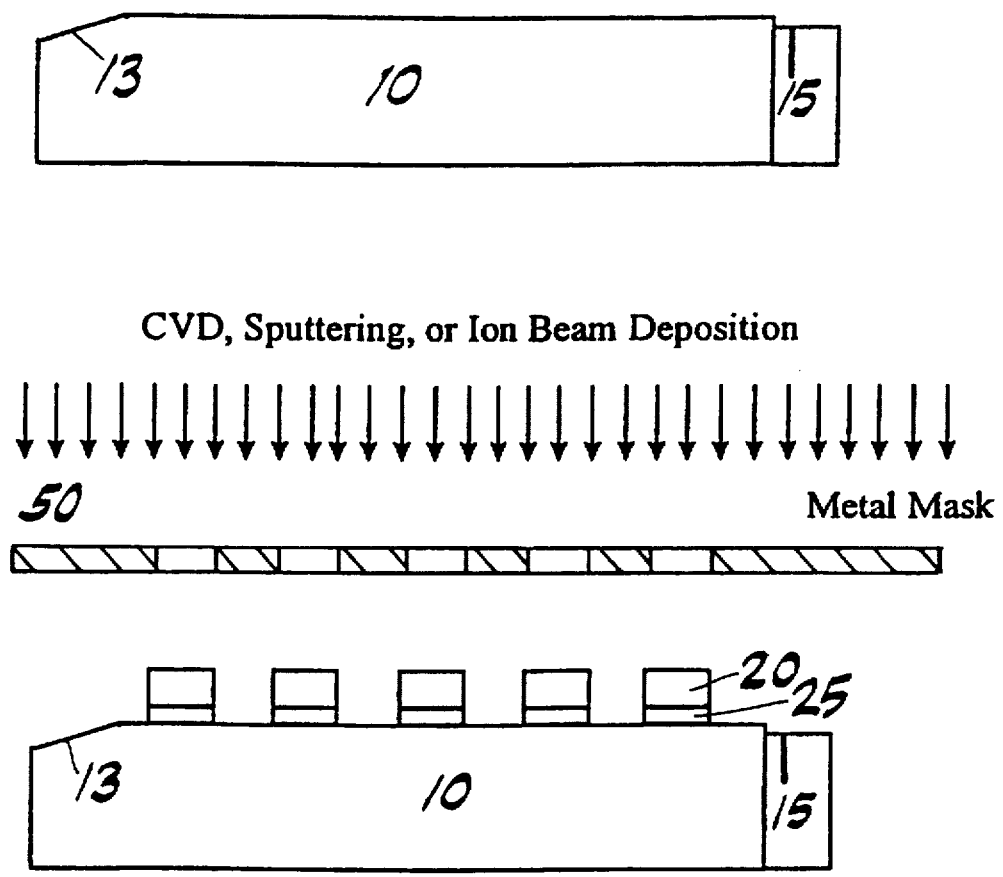
FIG. 4 is a schematic of a process flow for making a carbon overcoat array on a slider surface, according to the present invention, using a metal mask.

The following is a description of an exemplary embodiment of the present invention. Sliders having a negative pressure ABS design similar to that illustrated in FIG. 1 are fabricated. The carbon overcoat array is applied to the slider surface following the process flow shown in FIG. 4. A metal mask 50 with circular holes is placed adjacent to the top of the slider surface. Then carbon is deposited on the slider surface through the mask holes by a deposition process such as, for example, chemical vapor deposition (CVD), sputtering, or ion beam deposition. First a layer of $SiO_2$ 25 is deposited on the slider surface through the metal mask 50 and then a layer of carbon is deposited on the top of the $SiO_2$ layer to form the bumps 20. Then the slider is transferred to other conventional processes to finish the slider fabrication. In another exemplary embodiment, no $SiO_2$ layer is applied, and only carbon is applied to the slider surface, provided however that the adhesion between carbon and the slider surface is strong enough.

Figure 5:
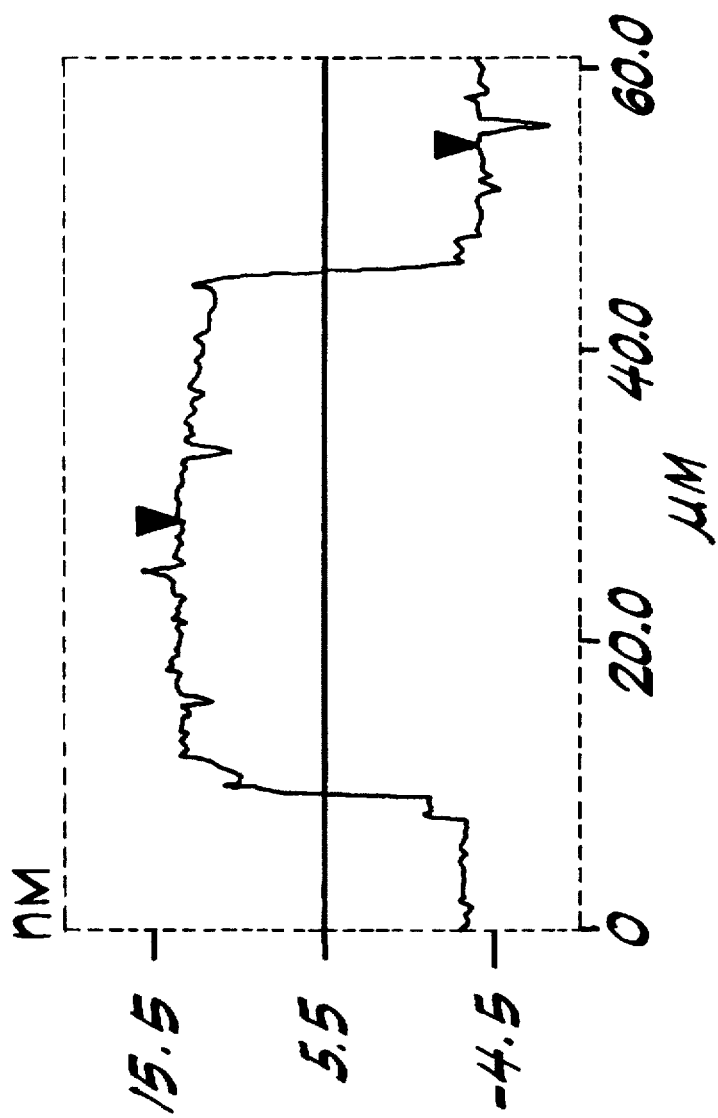
FIG. 5 is a surface profile measurement of one protrusion of the carbon overcoat array according to the present invention, using an Atomic Force Microscope.
Figure 6A:
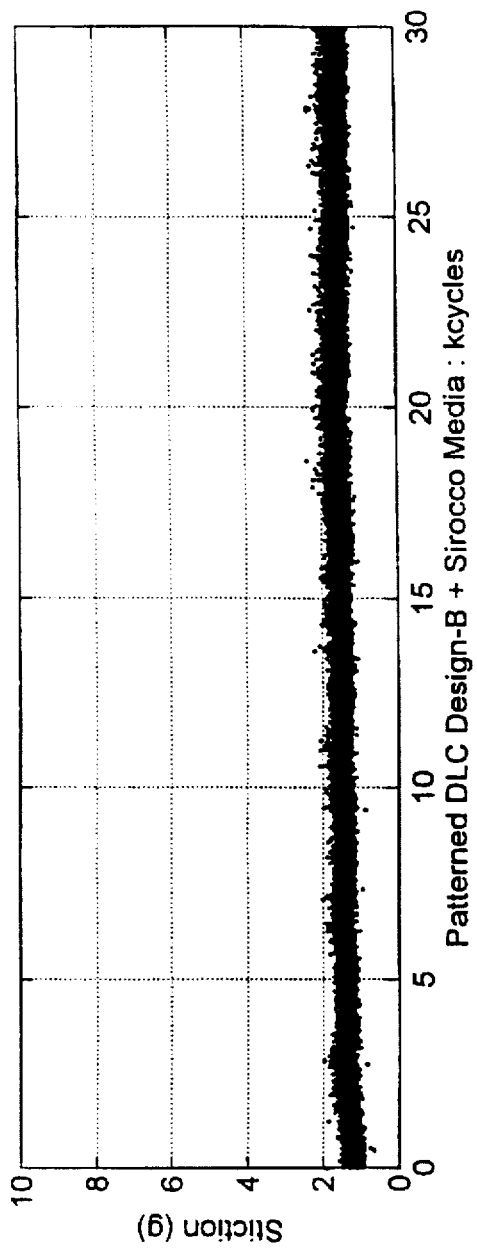
FIG. 6 shows, in graph form, a plot of stiction values versus CSS testing cycles for 50% sliders, with and without a carbon overcoat array according to the present invention, in respect of mechanical zone textured disk surfaces.
Figure 6B:
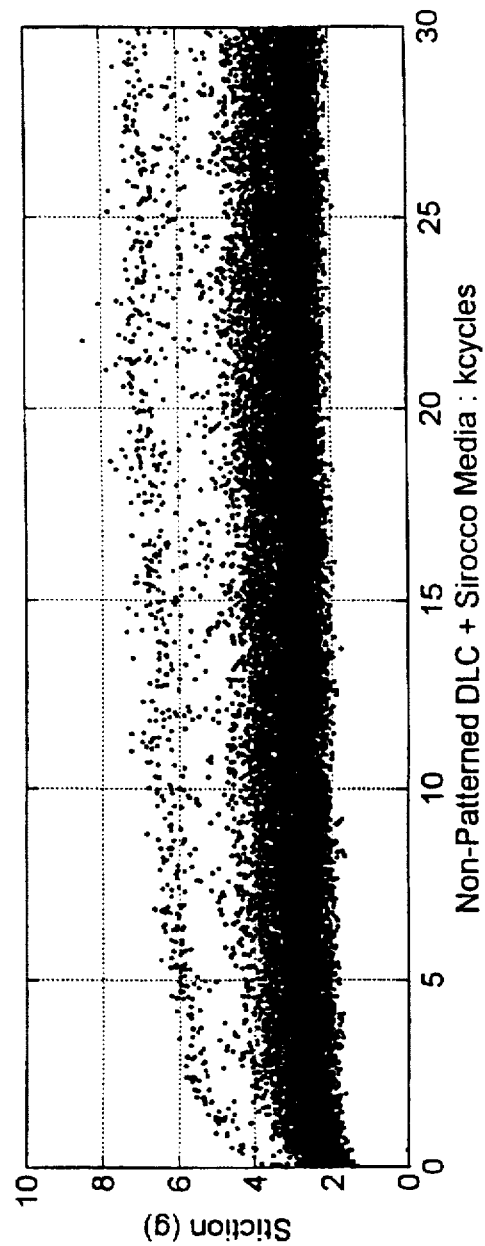

A 50% slider is fabricated using the above technique. FIG. 5 is a surface profile measurement of one of carbon bumps formed on the slider surface, using an Atomic Force Microscope (AFM). The seed layer and the carbon layer are deposited using the CVD technique. The $SiO_2$ layer is 20 Å thick and carbon thickness is 150 Å. The bump is circular in cross section, approximately 45 μm in diameter. The ratio of the total bump surface area to the total area of the ABS surface is 9.3%. A slider from the same lot with a 100% area ratio (no carbon bump array) is also used for comparison. The suspension load of the sliders is 5 gram. FIG. 6 shows the stiction values versus CSS testing cycles for test sliders with a carbon overcoat arrangement according to the present invention (top of FIG. 7)and without such a carbon overcoat array (bottom of FIG. 7) on mechanically zone-textured disk surfaces. The surface roughness of the test disks at the landing zone is around 50 Å (Ra). Clearly the stiction values for the test slider with a carbon overcoat array is about four times smaller throughout 30,000 cycles of CSS testing, than the stiction value for the test slider formed without the carbon bump array. It should be noticed that the stiction values of the slider with the carbon overcoat array did not increase by any appreciable amount at the end of the 30,000 cycles of testing, indicating excellent durability of the carbon bumps on the slider surface.

Figure 7:
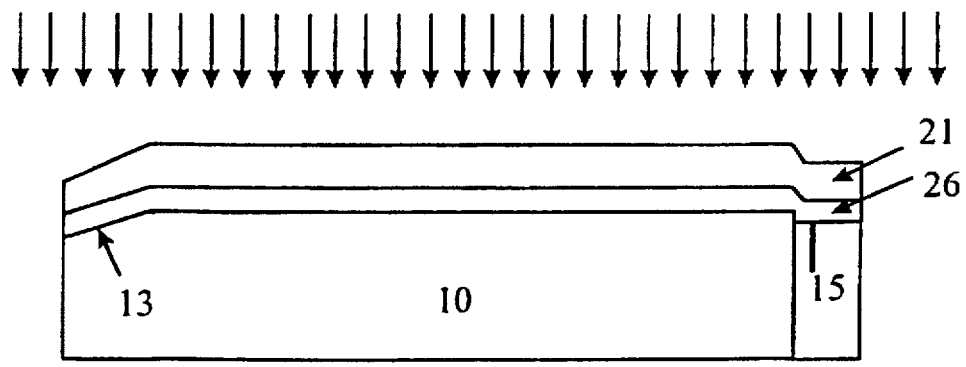
FIG. 7 is a schematic of a process flow for making a double carbon overcoat on a slider surface, using a metal mask.
Figure 7:
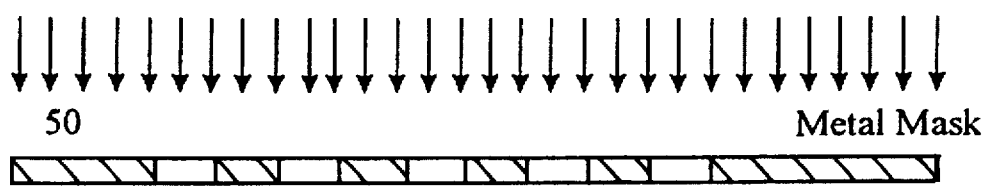
Figure 7:
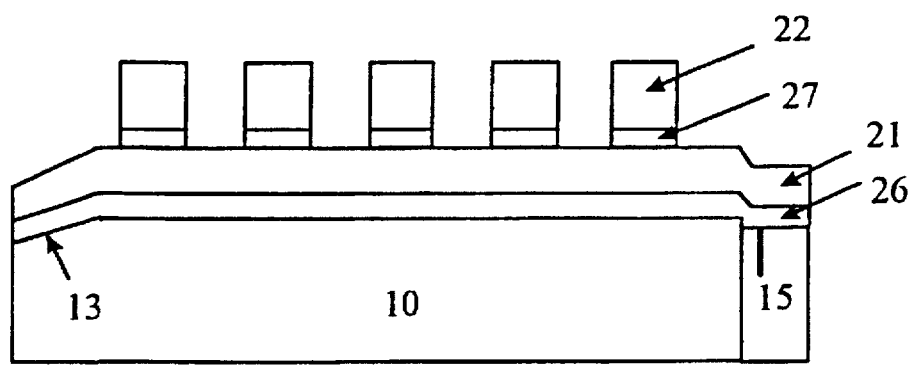

FIG. 7 is a schematic of a process flow for making a double carbon overcoat embodiment of the present invention, using a metal mask. First the slider surface is deposited uniformly with a $SiO_2$ layer 26 and a layer of carbon 21 by means of CVD, sputtering, or ion beam deposition. Then a metal mask is placed adjacent to the top of the slider surface. Another round of deposition is conducted through the metal mask holes to form a carbon bump array 22 on the first layer of carbon overcoat 21. The additional $SiO_2$ layer 27 is optional, depending upon adhesion between the two rounds of carbon deposition. In another exemplary embodiment, the carbon overcoat is deposited by an ion beam deposition technique. The first $SiO_2$ layer 26 is 20 Å thick. The first carbon layer 21 is 50 Å thick. The second $SiO_2$ layer is 10 Å thick and the second carbon bump overcoat is 200 Å thick. Each carbon bump is circular in cross section and 20 μm in diameter. The ratio of the area of the carbon overcoat array to the total ABS area is approximately 5.6%. Test sliders with and without the second carbon overcoat array were tested against a polished disk under CSS testing conditions. The disk roughness is around 20 Å (Ra). Again, the stiction values of the slider with a carbon overcoat array is about three times smaller throughout the 30,000 cycles of CSS testing.

Figure 8:
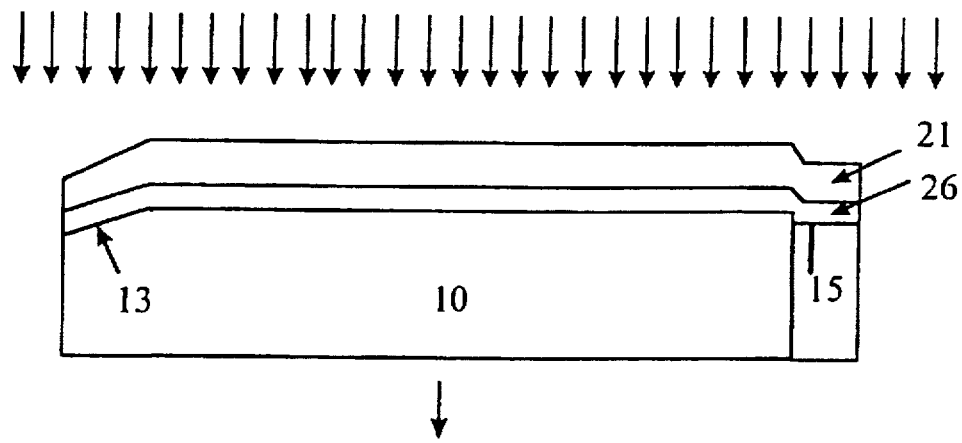
FIG. 8 is a schematic of a process flow for making a carbon overcoat array on a slider surface, using a back etching method.
Figure 8:
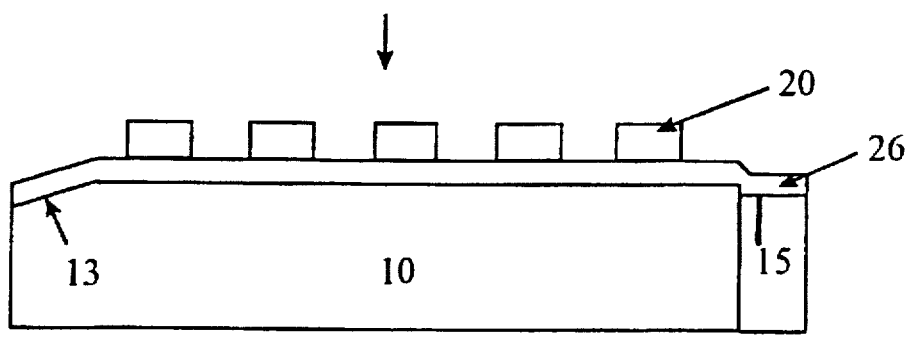

FIG. 8 is a schematic of a process flow for making a carbon overcoat array on slider surfaces using a back etching method. First the slider surface is deposited uniformly with a $SiO_2$ layer 26 and a layer of carbon 21 by means of CVD, sputtering, or ion beam deposition. Then a photo resist film is applied to the top of the overcoat. After exposure by ultra violet (UV) light irradiation through a photo mask with a specified pattern, photo resist without UV treatment is dissolved to develop a step in the specified pattern. Then the carbon overcoat without resist mask pattern is etched away by means of oxygen plasma etching or Reactive Ion Etching (RIE). Finally the resist mask is removed by acetone, leaving a layer of $SiO_2$ 26 to cover the whole slider surface plus a carbon overcoat array 23. In an example of this method, first a layer of $SiO_2$ of 35 Å and a layer of carbon overcoat of 250 Å are deposited on slider surfaces by sputtering. Then the carbon overcoat array is fabricated by using oxygen plasma etching. The final size of each carbon bump is 35 µm in diameter. The area ratio of the carbon overcoat array is around 12.3%. Sliders with and without back etched carbon bump arrays are tested in CSS testing against laser zone textured disks. A factor 2 in stiction reduction is observed when a slider with a carbon overcoat array is used after 20,000 CSS cycles. Also, the sliders with a thin layer of SiO$_2$, to protect read/write elements, were tested in a 30 degree centigrade/90% relative humidity environment for 10 days without observation of corrosion.

Figure 9:
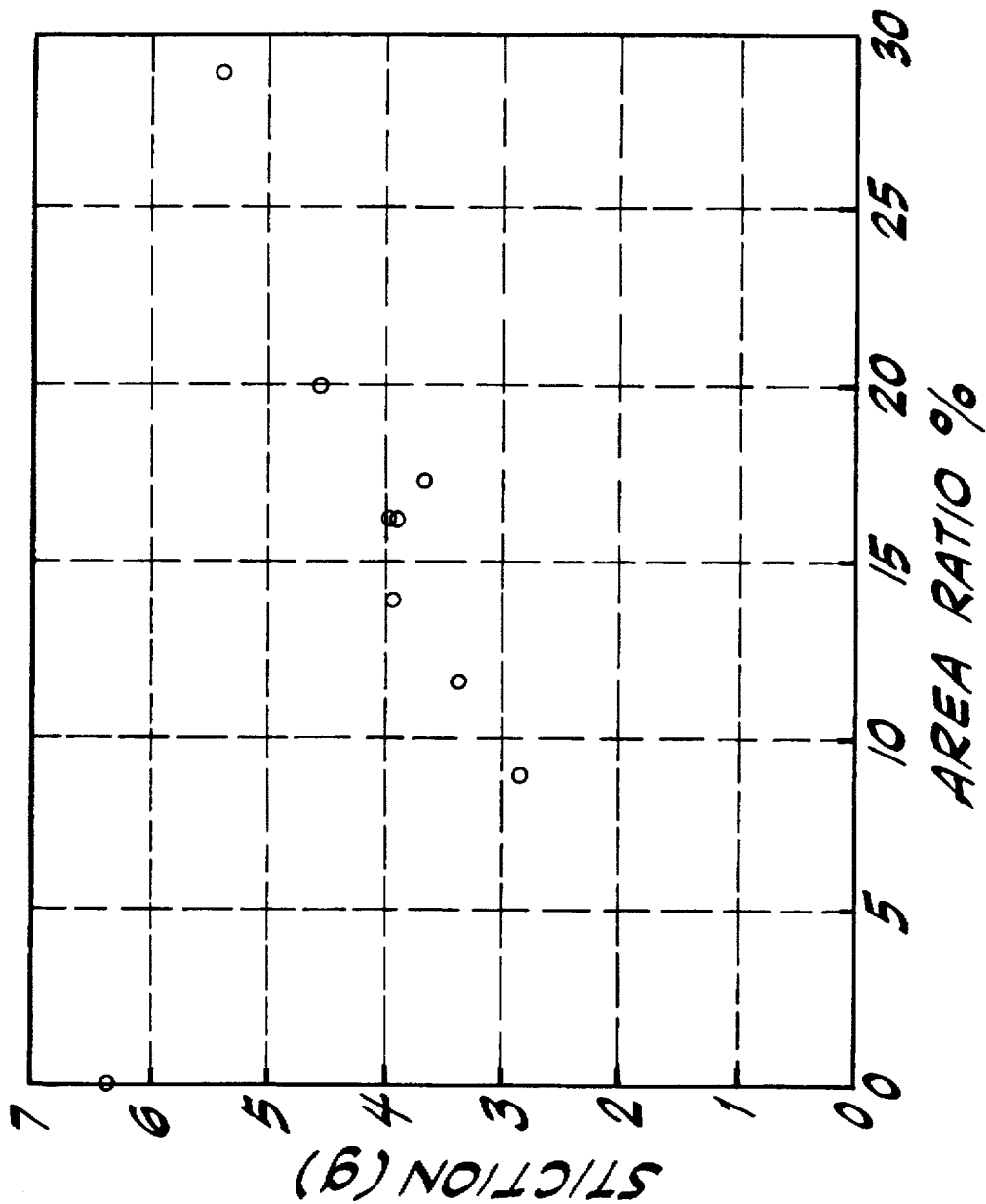
FIG. 9 shows, in graph form, a plot of stiction values versus various are ratios of the carbon overcoat array, relative to the total area of the slider.

It has been found that the operative dimensions for stiction reduction are the area ratio (total bump area to total ABS surface area), the height of the carbon bumps and the bump size. FIG. 9 shows the stiction value after 5,000 CSS cycles for sliders with different area ratios of the carbon overcoat array. The disks are polished disks with a roughness of 20 Å in Ra. The bumps are circular in cross section, 50 µm in diameter and 200 Å in height. The different area ratios are obtained by applying various numbers of the carbon bumps. Apparently the stiction values increases as the ratio increases. It has been determined that an optimal operating range for the area ratio is one percent to fifteen percent.

It has also been determined that an optimal bump height depends on the roughness value of the disk surface, the thickness of the lubricant on the disk surface and the slider profile. In exemplary embodiments, the height of the carbon bumps should be from 100 Å to 500 Å. Also the size of the carbon bumps should be a minimum size of 10 µm if the bump is circular in cross section.

As noted above, a wide range of slider profiles (measured in crown, camber and twist) are typically encountered in a practical manufacturing environment. The present invention provides an array of carbon overcoat protrusions spaced across the slider surface so that a carbon bump always contacts the disk surface regardless of slider profile. In tests discussed above, for a 50%, slider, the crown varied from negative 25 nm to positive 75 nm, the camber varied from negative 25 nm to positive 25 nm, and the twist varied from negative 50 nm to positive 50 nm. For a 30% slider, the crown varied from negative 10 nm to positive 40 nm, the camber varied from negative 25 nm to positive 25 nm, and the twist varied from negative 20 nm to positive 20 nm. In each instance, contact between the disk surface and the slider occurred at the overcoat protrusions.

What is claimed is:

1. For use in a disk drive having a disk that is rotated during operation of the disk drive and stationary when the disk drive is non-operational, the disk including a surface containing data tracks, a magnetic head comprising:

a slider including a forward edge, a trailing edge and an air bearing surface;

a read/write transducer mounted at the trailing edge of the slider;

the slider and transducer being mounted relative to the surface of the disk to fly above the surface of the disk during rotation of the disk for reading and writing data from and to the data tracks, and to come to rest on the surface of the disk during non-operation of the disk drive; and an array of overcoat protrusions formed on and spaced across the slider to cover a predetermined and discrete area of the slider in a manner so that during operation of the disk drive, spacing between lowest ones of the array of overcoat protrusions and the surface of the disk is greater than spacing between the trailing edge of the slider and the surface of the disk, and, in a transition between operation and non-operation of the disk drive, at a preselected time before contact with the surface of the disk, spacing between at least certain ones of the array of overcoat protrusions and the surface of the disk is less than spacing between the trailing edge of the slider and the surface of the disk, to provide contact with the surface of the disk only at the array of overcoat protrusions.

2. The magnetic head according to claim 1, wherein the array of overcoat protrusions comprises an array of carbon overcoat protrusions.

3. The magnetic head of claim 2, wherein each of the carbon overcoat protrusions comprises a carbon bump.

4. The magnetic head of claim 3, wherein each carbon bump is circular in cross section.

5. The magnetic head of claim 4, wherein each carbon bump has a diameter of at least approximately 10 µm.

6. The magnetic head of claim 3, wherein each carbon bump is between 100 Å and 500 Å in height.

7. The magnetic head of claim 3, wherein, during operation of the disk drive, spacing between lowest ones of the array of carbon overcoat protrusions and the surface of the disk is more than spacing between the slider and the surface of the disk, and, in a transition between operation and non-operation of the disk drive, at a preselected point before contact with the surface of the disk, spacing between at least certain ones of the array of carbon overcoat protrusions and the surface of the disk is less than spacing between the slider and the surface of the disk.

8. The magnetic head of claim 2, wherein the air bearing surface includes a side rail extending from the forward edge to the trailing edge of the slider.

9. The magnetic head of claim 2 further comprising a layer of SiO$_2$ applied to the slider, beneath the array of carbon overcoat protrusions.

10. The magnetic head of claim 9, wherein the layer of SiO$_2$ covers the transducer.

11. The magnetic head of claim 8, wherein the layer of SiO$_2$ is less than 100 Å in height.

12. The magnetic head of claim 2 wherein the ratio between the total surface area of the array of carbon protrusions and the air bearing surface of the slider is approximately 1% to approximately 15%.

13. The magnetic head of claim 2 further comprising a layer of carbon applied to the slider, beneath the array of carbon overcoat protrusions.

14. The magnetic head of claim 13 wherein the layer of carbon is less than 100 Å in height.

15. The magnetic head of claim 14 wherein each carbon protrusion is between 100 Å and 500 Å in height.

16. The magnetic head of claim 11 further comprising a layer of SiO$_2$ applied to the slider, beneath the layer of carbon.

17. The magnetic head of claim 1, wherein the transducer comprises a magnetoresistive transducer.

* * * * *